United States Patent [19]

Schreiber et al.

[11] 3,914,451
[45] Oct. 21, 1975

[54] IMPARTING A NUTTY FLAVOR WITH 2-BUTYL-2-BUTENAL

[75] Inventors: William J. Schreiber, Jackson; Alan O. Pittet, Atlantic Highlands; Manfred Hugo Vock, Locust, all of, NJ; Edward J. Shuster, Brooklyn, N.Y.; Alton Dewitt Quinn, Abrahamsville, Pa.

[73] Assignee: International Flavors & Fragrances Inc., New York, N.Y.

[22] Filed: Oct. 15, 1974

[21] Appl. No.: 514,946

Related U.S. Application Data

[63] Continuation-in-part of Ser. No. 389,128, Aug. 17, 1973, abandoned.

[52] U.S. Cl. ............... 426/534; 252/522; 131/17 R; 260/601 R; 131/144; 426/536; 426/537; 426/538
[51] Int. Cl.² ......................................... A23L 1/226
[58] Field of Search ............ 426/65, 175; 260/601 R

[56] References Cited
UNITED STATES PATENTS 3,574,715    4/1971    Marbet et al. ............... 260/601 R X
3,584,010    6/1971    Marbet ........................ 260/601 R X
3,654,309    4/1972    Thomas ........................ 260/601 R X
3,686,003    8/1972    Van Dorp et al. ..................... 426/65

*Primary Examiner*—Joseph M. Golian
*Attorney, Agent, or Firm*—Arthur L. Liberman, Esq.; Harold Haidt, Esq.

[57] ABSTRACT

Methods for preparing foodstuffs, flavoring compositions for foodstuffs, tobacco compositions, flavoring compositions for tobacco, perfume compositions and ingredients for perfume compositions by including therein 2-butyl-2-butenal to produce:
 a. In food flavorings, sweet, light roasted, weak, fatty and hazelnut-like notes;
 b. In perfumes, green, slight fruity aromas;
 c. In tobaccos, a natural, sweet and rum note and/or enhanced hazelnut flavors.

2 Claims, No Drawings

IMPARTING A NUTTY FLAVOR WITH 2-BUTYL-2-BUTENAL

This application is a Continuation-in-Part of application for U.S. letters Patent No. 389,128, filed on Aug. 17, 1973 and now abandoned.

BACKGROUND OF THE INVENTION

The present invention relates to novel methods and compositions using 2-butyl-2-butenal to alter the flavor and/or aroma of consumable materials.

There has been considerable work performed related to substances which can be used to impart (or enhance) flavors to (or in) various consumable materials. These substances are used to diminish natural materials, some of which may be in short supply and to provide more uniform properties in the finished product. Sweet, light roasted, weak, fatty, hazelnut-like notes are particularly desirable for many uses in consumable articles e.g., foodstuffs. Rum notes and hazelnut flavors are particularly desirable in tobacco. Green, slight fruity notes are desirable in perfume compositions.

2-Isopropyl-5-methyl-2-hexenal is disclosed in U.S. Pat. No. 3,704,714 as causing tobacco to have an enhanced cocoa, burley character and as imparting a complex flavor spectrum to tobacco characterized by a woody, turkish note. The same compound is described by Yamanishi et al. at page 18360D, Volumn 51, Chem. Abstracts as having a sweet, fruit-like mixed with coumarin odor. Fenaroli's Handbook of Flavor Ingredients describes the following unsaturated aldehydes as having particular flavor characteristics thus:

| Aldehyde | Flavor Characteristics |
| --- | --- |
| 2-Hexenal | Green, leafy odor |
| 2-Dodecenal | Powerful, citrus, mandarin orange-like odor at low levels; mandarin taste |

Alpha amyl acrolein is described as having a strong, spicey odor in Helv. Chim. Acta. 30, 1495–1501 (1947) [Hinder et al.].

In no prior art, however, does there exist a disclosure of a material which is both non-toxic and provides a sweet, light roasted, weak, fatty hazelnut-like taste to foodstuffs as well as a green slight fruity note to fragrances and a natural rum note to tobaccos.

THE INVENTION

It has now been discovered that novel solid and liquid foodstuff and flavoring compositions having sweet, light roasted, weak fatty, especially hazelnut-like taste notes; and novel aroma imparting compositions having green, slight fruity notes; as well as tobacco compositions having sweet rum notes and/or enhanced hazelnut flavor may be provided by the utilization of 2-butyl-2-butenal. Thus, the 2-butyl-2-butenal of our invention is capable of supplying and/or potentiating certain flavor and aroma notes usually lacking in many nut-type flavors as well as rum flavors and/or hazelnut flavors heretofore provided and tobacco flavors heretofore provided. Furthermore, the 2-butyl-2-butenal of our invention is capable of supplying certain fragrance notes usually lacking in many perfumery materials, for example, lavender fragrances.

When the 2-butyl-2-butenal of our invention is used as a food flavor adjuvant, the nature of the co-ingredients included with the said 2-butyl-2-butenal in formulating the product composition will also serve to alter the organoleptic characteristics of the ultimate foodstuff treated therewith. As used herein in regard to flavors, the term "alter" in its various forms means "supplying or imparting flavor character or note to otherwise bland, relatively tasteless substances or augmenting the existing flavor characteristic where a natural flavor is deficient in some regard or supplementing the existing flavor impression to modify its quality, character or taste". As used herein the term "foodstuff" includes both solids and liquids ingestible materials which usually do, but need not, have nutritional value. Thus, foodstuffs include meats, gravies, soups, convenience foods, beverages, dairy products, candies, vegetables, cereals, soft drinks, snacks and the like.

Substances suitable for use herein as co-ingredients or flavoring adjuvants are well known in the art for such use being extensively described in the relevant literature. Apart from the requirement that any such material be "ingestibly" acceptable and thus non-toxic or otherwise non-deleterious nothing particularly critical resides in selection thereof. Accordingly, such materials which may in general be characterized as flavoring adjuvants or vehicles comprise broadly stabilizers, thickeners, surface active agents, conditioners, other flavorants and flavor intensifiers.

Stabilizer compounds include preservatives, e.g., sodium chloride; antioxidants, e.g., calcium and sodium ascorbate, ascorbic acid, butylated hydroxyanisole (mixture of 2 and 3 tertiary butyl-4-hydroxyanisole), butylated hydroxy toluene (2,6-di-tertiary-butyl-4-methyl phenol), propyl gallate and the like and sequestrants, e.g., citric acid.

Thickener compounds include carriers, binders, protective colloids, suspending agents, emulsifiers and the like, e.g., agaragar; carrageenan; cellulose and cellulose derivatives such as carboxymethyl cellulose and methyl cellulose; natural and synthetic gums such as gum arabic, gum tragacanth; gelatin, proteinaceous materials; lipids; carbohydrates; starches pectins, and emulsifiers, e.g., mono-and diglycerides of fatty acids, skim milk powder, hexoses, pentoses, disaccharides, e.g., sucrose, corn syrup solids and the like.

Surface active agents include emulsifying agents, e.g., fatty acids such as capric acid, caprylic acid, palmitic acid, myristic acid and the like, mono-and diglycerides of fatty acids, lecithin, defoaming and flavor-dispersing agents such as sorbitan monostearate, potassium stearate, hydrogentated tallow alcohol and the like.

Conditioners include compounds such as bleaching and maturing agents, e.g., benzoyl peroxide, calcium peroxide, hydrogen peroxide and the like; starch modifiers such as peracetic acid, sodium chlorite, sodium hypochlorite, propylene oxide, succinic anhydride and the like, buffers and neutralizing agents, e.g., sodium acetate, ammonium bicarbonate, ammonium phosphate, citric acid, lactic acid, vinegar and the like; colorants, e.g., carminic acid, cochineal, turmeric and curcuma and the like; firming agents such as aluminum sodium sulfate, calcium chloride and calcium gluconate; texturizers; anti-caking agents, e.g., aluminum calcium sulfate and tribasic calcium phosphate; enzymes; yeast foods, e.g., calcium lactate and calcium sulfate; nutrient supplements, e.g., iron salts such as ferric phosphate, ferrous gluconate and the like, riboflavin, vitamins, zinc sources such as zinc chloride, zinc sulfate and the like.

Other flavorants and flavor intensifiers include organic acids, e.g., fatty saturated acids, unsaturated acids, and amino acids, alcohols, e.g., primary and secondary alcohols; esters, carbonyl compounds including aldehydes and ketones as well as lactones; cyclic organic materials including benzene derivatives; isocyclics, heterocyclics such as furans, particularly 3-acetyl furan and 2-methyl-2,3-dihydrofuran-3-one, pyridines, pyrazines (particularly monoalkyl, dialkyl, trialkyl and tetraalkyl substituted pyrazines) and the like, sulfur-containing materials including thiazoles, disulfides, thiols, sulfides, aldehydes, (for example, 3-phenyl-4-pentenal, 3-phenyl-3-pentenal, 3-phenyl-2-pentenal, 2-phenyl-2-pentenal and 2-phenyl-3-methyl-2-butenal); disulfides and the like; other flavor potentiators such as monosodium glutamate, guanylates, inosinates, natural and synthetic flavorants such as vanillin, ethyl vanillin, diacetyl, phenethyl-2-furoate, maltol, natural gums and the like; spices, herbs, essential oils and extractives including "bitterness principles" such as theobromin, caffein, naringin and other suitable materials creating a bitter effect.

The specific flavoring adjuvant selected for use may be either solid or liquid depending upon the desired physical form of the ultimate product, i.e., foodstuff, whether simulated or natural, and should, in any event, be capable of providing an environment in which the 2-butyl-2-butanel can be dispersed or admixed to provide a homogeneous medium. In addition, selection of one or more flavoring adjuvants as well as the quantities thereof will depend upon the precise organoleptic character desired in the finished product. Thus, in the case of flavoring compositions, ingredient selection will vary in accordance with the foodstuff to which the flavor and aroma are to be imparted. In contradistinction, in the preparation of solid products, e.g., simulated foodstuffs, ingredients capable of providing normally solid compositions should be selected such as various cellulose derivatives.

As will be appreciated by those skilled in the art, the amount of 2-butyl-2-butenal employed in a particular instance can vary over a relatively wide range whereby to its desired organoleptic effects having reference to the nature of the product are achieved. All parts and percentages given herein are by weight unless otherwise specified. Thus, correspondingly greater amounts would be necessary in those instances wherein the ultimate food composition to be flavored is relatively bland to the taste, whereas relatively minor quantities may suffice for purposes of enhancing the composition merely deficient in natural flavor or aroma. Thus, the primary requirement is that the amount selected to be effective, i.e., sufficient to alter the organoleptic characteristics of the parent composition, whether foodstuff per se or flavoring composition. Thus, the use of insufficient quantities of 2-butyl-2-butenal will, of course, substantially vitiate any possibility of obtaining the desired results while excess quantities prove needlessly costly and in extreme cases, may disrupt the flavor-aroma balance, thus proving self-defeating. Accordingly, the terminology "effective amount" and "sufficient amount " is to be accorded a significance in the context of the present invention consistent with the obtention of desired flavoring effects.

Thus, and with respect to ultimate food compositions, it is found that quantities of 2-butyl-2-butenal ranging from a small but effective amount, e.g., 0.01 parts per million up to about 50 parts per million by weight based on total composition are suitable. Concentrations in excess of the maximum quantity stated are not normally recommended since they fail to provide commensurate enhancement of organoleptic properties. In those instances wherein the 2-butyl-2-butenal is added to the foodstuff as an integral component of a flavoring composition, it is of course essential that the total quantity of flavoring composition employed be sufficent to yield an effective 2-butyl-2-butenal concentration in the foodstuff product.

Food flavoring compositions prepared in accordance with the present invention preferably contain the 2-butyl-2-butenal in concentrations ranging from about 0.015% up to about 10% by weight based on the total weight of said flavoring composition.

The compositions described herein can be prepared according to conventional techniques well known as typified by cake batters and vegetable juices can be formulated by merely admixing the involved ingredients within the proportions stated in a suitable blender to obtain the desired consistency, homogeneity of dispersion, etc. Alternatively, flavoring compositions in the form of particulate solids can be conveniently prepared by mixing the 2-butyl-2-butenal with for example gum arabic, gum tragacanth, carrageenan and the like, and thereafter spray-drying the resultant mixture whereby to obtain the particular solid product. Pre-prepared flavor mixes in powder form, e.g., a vanilla powder mix or a walnut flavored powder mix are obtained by mixing the dried solid components, e.g., starch, sugar and the like and 2-butyl-2-butenal in a dry blender until the requisite degree of uniformity is achieved.

It is presently preferred to combine with the 2-butyl-2-butenal the following adjuvants:

| | |
|---|---|
| Ethyl-2-methylbutyrate | 2-ethyl-3-methyl pyrazine |
| Vanillin | 2-ethyl-3,5-dimethyl pyrazine |
| Butyl valerate | Tetramethyl pyrazine |
| 2,3-Diethyl pyrazine | 2-methyl-3-acetyl pyrazine |
| Cyclotene | 2-acetyl pyrazine |
| Benzaldehyde | 2-methyl-5-acetyl pyrazine |
| Maltol | 2,3,5-trimethyl pyrazine |
| Ethyl vanillin | |
| 1,2-benzodihydropyrone | |
| Anise aldehyde | |

An additional aspect of our invention provides organoleptically improved smoking tobacco products and additives therefor, as well as methods of making the same which overcome specific problems heretofore encountered in which (i) specific desired sweet, more-natural rum flavor characteristics of tobacco are created or in which (ii) the hazelnut flavor of tobacco is enhanced and such characteristics may be readily controlled and maintained at the desired uniform level regardless of variations in the tobacco components of the blend.

This invention further provides improved tobacco additives and methods whereby desirable sweet, more-natural rum flavor characteristics may be imparted to smoking tobacco products and may be readily varied and controlled to produce the desired uniform flavoring characteristics.

In carrying out this aspect of our invention, we add to smoking tobacco materials or a suitable substitute therefore (e.g., dried lettuce leaves) an aroma and flavor additive containing as an active ingredient, 2-butyl-2-butenal.

In addition to the 2-butyl- 2-butenal of our invention other flavoring and aroma additives may be added to the smoking tobacco material or substitute therefor either separately or in mixture with the 2-butyl-2-butenal as follows:

I. Synthetic Materials
Beta-ethyl-cinnamaldehyde;
Eugenol;
Dipentene;
Damascenone;
Maltol;
Ethyl maltol;
Delta undecalactone;
Delta decalactone;
Benzaldehyde;
Amyl acetate;
Ethyl butyrate;
Ethyl valerate;
Ethyl acetate;
2-Hexenol-1,2-methyl-5-isopropyl-1,3-nonadiene-8-one;
2,6-Dimethyl-2,6-undecadiene-10-one;
2-Methyl-5-isopropyl acetophenone;
2-Hydroxy-2,5,5,8a-tetramethyl-1-(2-hydroxyethyl)-decahydronaphthalene;
Dodecahydro-3a-6,6,9a-tetramethyl naphtho-(2,1-b)-furan;
4-Hydroxy hexanoic acid, gamma lactone;
Polyisoprenoid hydrocarbons defined in Example V of U.S. Pat. No. 3,589,372 issued on June 29, 1971.

II. Natural Oils
Celery seed oil;
Coffee extract;
Bergamot oil;
Cocoa extract;
Nutmeg oil;
Origanum oil.

An aroma and flavoring concentrate containing 2-butyl-2-butenal and, if desired, one or more of the above-indicated additional flavoring additives may be added to the smoking tobacco material, to the filter or to the leaf or paper wrapper. The smoking tobacco material may be shredded, cured, cased and blended tobacco material or reconstituted tobacco material or tobacco substitutes (e.g., lettuce leaves) or mixtures thereof. The proportions of flavoring additives may be varied in accordance with taste but insofar as the imparting of sweet, more-natural rum notes, we have found that satisfactory results are obtained if the proportion by weight of the sum total of 2-butyl-2-butenal to smoking tobacco material is between 100 ppm and 500 ppm (0.1%–0.05%) of the active ingredients to the smoking tobacco material. Furthermore, insofar as enhancement of hazelnut flavor in tobacco, we have found that satisfactory results are obtained if the proportions by weight of the sum total of 2-butyl-2-butenal to smoking tobacco material is between 20 ppm and 150 ppm (0.002%–0.015%) of the active ingredients to the smoking tobacco material. We have further found that satisfactory results are obtained if the proportion by weight of the sum total of 2-butyl-2-butenal used to flavoring material is between 0.002 and 0.05.

Any convenient method for incorporating the 2-butyl-2-butenal in the tobacco product may be employed. Thus the 2-butyl-2-butenal taken alone or along with other flavoring additives may be dissolved in a suitable solvent such as ethanol, pentane, diethyl ether and/or other volatile organic solvents and the resulting solution may either be spread on the cured, cased and blended tobacco material or the tobacco material may be dipped into such solution. Under certain circumstances, a solution of 2-butyl-2-butenal taken alone or taken further together with other flavoring additives as set forth above, may be applied by means of a suitable applicator such as a brush or roller on the paper or leaf wrapper for the smoking product, or it may be applied to the filter by either spraying, or dipping, or coating.

Furthermore, it will be apparent that only a portion of the tobacco or substitute therefore need be treated and the thus treated tobacco may be blended with other tobaccos before the ultimate tobacco product is formed. In such cases, the tobacco treated may have the 2-butyl-2-butenal in excess of the amounts or concentrations above indicated so that when blended with other tobaccos, the final product will have the percentage within the indicated range.

In accordance with one specific example of our invention an aged, cured and shredded domestic burley tobacco is spread with a 20% ethyl alcohol solution 2-butyl-2-butenal in an amount to provide a tobacco composition containing 500 ppm by weight of 2-butyl-2-butenal on a dry basis. Thereafter, the alcohol is removed by evaporation and the tobacco is manufactured into cigarettes by the usual techniques. The cigarette when treated as indicated has a desired and pleasing aroma which is detectable in the main and side streams when the cigarette is smoked. This aroma is described as being less harsh and having sweet, natural rum notes.

While our invention is particularly useful in the manufacture of smoking tobacco, such as cigarette tobacco, cigar tobacco, and pipe tobacco, other tobacco products formed from sheeted tobacco dust or fines may also be used. Likewise, the 2-butyl-2-butenal of our invention can be incorporated with materials such as filter tip materials, seam paste, packaging materials and the like which are used along with tobacco to form a product adapted for smoking. Furthermore, the 2-butyl-2-butenal can be added to certain tobacco substitutes of natural or synthetic origin (e.g., dried lettuce leaves) and, accordingly, by the term "tobacco" as used throughout this specification is meant any composition intended for human comsumption, by smoking or otherwise, whether composed of tobacco plant parts or substituted materials or both.

2-Butyl-2-butenal and an auxiliary perfume ingredient, including, for example, alcohols, aldehydes, nitriles, esters, cyclic esters, and natural essential oils, may be admixed so that the combined odors of the individual components produce a pleasant and desired fragrance, particularly and preferably in lavender fragrances. Such perfume composition usually contain (a) the main note or the "bouquet" or foundation stone of the composition; (b) modifiers which round off and accompany the main note; (c) fixatives which include odorous substances which lend a particular note to the perfume throughout all stages of evaporation and substances which retard evaporation; and (d) topnotes which are usually low boiling fresh smelling materials.

In perfume compositions, the individual components will contribute its particular olfactory characteristics, but the over-all effect of the perfume composition will be the sum of the effects of each of the ingredients. Thus, 2-butyl-2-butenal can be used to alter the aroma characteristics of a perfume composition, for example, by utilizing or moderating the olfactory reaction contributed by another ingredient in the composition.

The amount of 2-butyl-2-butenal of our invention which will be effective in perfume compositions depends on many factors, including the other ingredients, their amounts and the effects which are desired. It has been found that perfume compositions containing as little as 0.3% of 2-butyl-2-butenal or even less (e.g., 0.05%) can be used to impart a scent odor to soaps, cosmetics or other products. The amount employed can range up to 5% of the fragrance components and will depend on considerations of cost, nature of the end product, the effect desired on the finished product and the particular fragrance sought.

2-Butyl-2-butenal is useful in perfume compositions as an olfactory component in detergents and soaps; space odorants and deodorants, perfumes, colognes, toilet water, bath preparations, such as bath oils and bath solids; hair preparations, such as lacquers, brilliantines, pomades and shampoo; cosmetic preparations, such as creams, deodorants, hand lotions, and sun screens; powders, such as talcs, dusting powders, face powders and the like. When used as an olfactory component of a perfumed article, as little as 100 parts per million of 2-butyl-2-butenal will suffice to impart a low keyed green, fruity character which is one of the key odor characteristics of lavender perfume formulations. Generally, no more than 0.8% of 2-butyl-2-butenal based on the ultimate end product is required in the perfume composition.

In addition, the perfume composition or fragrance composition of our invention can contain a vehicle or carrier for the 2-butyl-2-butenal. The vehicle can be a liquid such as an alcohol, a non-toxic alcohol, a non-toxic glycol, or the like. The carrier can also be an absorbent solid, such as a gum (e.g. gum arabic) or components for encapsulating the composition (such as gelatin).

It will thus be apparent that 2-butyl-2-butenal can be utilized to alter the sensory properties, particularly organoleptic properties, such as flavor and/or fragrance of a wide variety of consumable materials.

The following examples are given to illustrate embodiments of the invention as it is presently preferred to practice it. It will be understood that these examples are illustrative, and the invention is not to be considered as restricted thereto except as indicated in the appended claims.

EXAMPLE I (Preparation of 2-Butyl-2-Butenal)

Into a 22 liter flask equipped with addition funnel, reflux condenser, thermometer, mechanical stir and heating mantle, the following ingredients are placed:

| | |
|---|---|
| Methanol | 2 kilograms |
| Potassium Hydroxide, 85% | 250 grams |

The mixture of methanol and potassium hydroxide is heated to reflux. The heating mantle is removed and a pre-formed mixture of two aldehydes: 3 kilograms of hexaldehyde and 4.5 kilograms of food grade acetaldehyde is added at a rate sufficient to maintain gentle reflux. The addition is completed in approximately two hours after which the mixture is heated at reflux for a half hour. 2 Liters of 10% (volume/volume) sulfuric acid is then added quickly (bringing the pH to approximately 3) and steam distillation is begun. When the head temperature reaches 100°C removal of the product is complete. The distillate is transferred to a separatory funnel and the oil is separated (the oil layer is the upper layer). The aqueous layer is extracted with 1 liter cyclohexane. The organic layers are combined and the combined organic layers are washed with two 200 ml portions of saturated sodium bicarbonate and two 200 ml portions of water. The solvent is removed at 100 mm Hg. pressure and the residue is distilled to provide 297 grams (7.8 %) of flavor-acceptable butyl butenal having a boiling point of 65°C at 9 mm Hg. pressure.

The product has the following spectral characteristics: IR (neat) 1680, 1640, 2705, NMR (CDCl$_3$ solution) $\delta$ 0.86 (m, 3H), 1.28 (M, 4H), 2.02 (d, J = 7.5 Hz, 3H), 6.47 (q, J = 7.5 Hz, 1H), 9.28 (s, 1H); MS m/e (relative abundance) 55 (100 ), 41 (99), 27 (95), 39 (90), 29 (70), 43 (55), 126 (45).

EXAMPLE II

The following formulation is prepared:

| Ingredients | Parts by Weight |
|---|---|
| Ethyl-2-methyl butyrate | 10.0 |
| Vanillin | 40.0 |
| Butyl valerate | 40.0 |
| 2,3-Diethyl pyrazine | 5.0 |
| Cyclotene | 80.0 |
| Benzaldehyde | 60.0 |
| Valerian oil Indian 1% (in 95% alcohol) | 0.5 |
| Propylene glycol | 764.5 |

To the above formulation, 2-butyl-2-butenal prepared according to the process of Example I is added at the rate of 1%. This formulation is compared to the same formulation but without the 2-butyl-2-butenal. Both flavors are compared in water at the rate of 20 ppm by a small bench panel of flavor experts. The formulation containing the 2-butyl-2-butenal is considered as having a sweeter, nuttier note, characteristics desired for nut flavors and was unamiously preferred by the panel.

EXAMPLE III

The following formulation is prepared:

| Ingredients | Parts by Weight |
|---|---|
| Maltol | 20 |
| Vanillin | 180 |
| Ethyl vanillin | 60 |
| 1,2-Benzodihydropyrone (10% in 95% ethanol solution) | 10 |
| Anisaldehyde (1% in 95% ethanol) | 5 |
| Balsam Peru (1% in 95% ethanol) | 15 |
| Ethanol 95% | 710 |

2-Butyl-2-butenal prepared according to the process of Example I is added to the above formulation at the rate of 0.1%. This formulation is compared to a similar formulation but not containing the 2-butyl-2-butenal.

Both flavors are compared in water at the rate of 200 ppm (0.02%). The flavor containing the 2-butyl-2-butenal has a rich, sweet note contributing to the vanilla flavor and improving it, giving it in addition a fuller mouthfeel. It is therefore preferred against the formulation which does not contain the 2-butyl-2-butenal.

EXAMPLE IV

The following formulation is prepared:

| Ingredients | Parts by Weight |
| --- | --- |
| 2-Butyl-2-butenal | 5 |
| Linalool | 350 |
| Linalyl Acetate | 450 |
| Turpentine | 30 |
| Methyl hexyl ether | 5 |
| Terpinenol | 5 |
| Hexenol | 3 |
| Ocimene | 40 |
| Amyl vinyl carbinol | 2 |
| Amyl vinyl carbinyl acetate | 15 |
| Lavandulol | 10 |
| Lavandulyl acetate | 30 |
| Caryophyllene | 50 |
| Ethyl amyl ketone | 10 |
| Terpineol | 20 |
| Eucalyptus oil | 50 |
| Borneol | 5 |
| Camphor gum | 10 |
| Coumarin | 10 |
| Geraniol | 5 |
| Geranyl acetate | 5 |

The 2-butyl-2-butenal imparts to this lavendar formulation, a sweet, fatty, slight cheesey note so necessary for lavendar formulations.

EXAMPLE V

A white bread dough mix is prepared by mixing 1350 g wheat flour and 800 ml water. To the mix is added:

| Ingredient | Amount (grams) |
| --- | --- |
| Yeast | 27.0 |
| Sodium Chloride | 27.0 |
| Sucrose | 67.5 |
| Shortening | 54 |
| Non-fat dry milk powder | 40.5 |
| Yeast food (Arkady; Manufactured by Fleischmann, Div. of Standard Brands) | 0.50 |
| Softening agent (succinylated monoglycerides; Manufactured by Kraft Div. of National Dairy Products Corporation) | 3.4 |

Six grams of the flavor of Example II are then added to the dough. The dough is then mixed for 8 minutes and allowed to rise for 45 minutes at 40°C. The dough is then baked for 45 minutes at 210°C.

The breadstuff product obtained has a pleasant nut-like flavor note reminiscent of the crust of home-made white bread containing actual particles of hazelnuts and has good flavor characteristics when spread with margarine.

By way of comparison, breadstuffs similarly prepared but omitting the 2-butyl-2-butenal have a flat taste.

EXAMPLE VI

A cake mix is prepared by admixing 1 cup of sifted sugar with ¼ cup butter, followed by beating into the resulting mixture 1 egg yolk. To the resulting mixture, 2 cups of cake flour are added. The mixture is then admixed with 3 tsp. of baking powder and ¼ tsp. salt. To the resulting mixture the following formulation is added.

---

1 tsp. vanilla
½ tsp. almond extract
¼ lb. chopped nutmeats
4% by weight, based on the total weight of flavoring composition, of 2-butyl-2-butenal

---

After the flavor formulation is mixed with the cake batter, 1 beaten egg white is added and blended into the mixture. The resulting cake batter is then baked in a greased 2 inches × 8 inches loaf pan in an oven operated at a temperature of 350°F for a period of 32 minutes.

The resulting cake has an excellent nut-like flavor and aroma with enhanced vanilla and hazelnut-like nuances.

EXAMPLE VII

The following tobacco flavor formulation is prepared:

| Ingredients | Parts by Weight |
| --- | --- |
| Peru Balsam | 0.13 |
| Ethyl acetate | 0.06 |
| Sugar | 2.00 |
| Jamaica rum | 8.00 |
| Distillate prepared by distilling the following ingredients: | |
| 95% Ethanol | 34 |
| Water | 20 |
| Vinegar | 1.5 |
| Sugar syrup | 1.0 |
| Tannnin | 0.38 |
| Sulfuric acid | 0.19 |
| Carbon black | 0.25 |

The above formulation is added to smoking tobacco (bright, burley, turkish, homogenized tobacco) at the rate of 1–3% by weight of the tobacco. The tobacco is then formulated into cigarettes by the usual manufacturing procedures:

(i) At the rate of 100 ppm to each cigarette is added 2-butyl-2-butenal. The use of the 2-butyl-2-butenal enhances the natural rum character causing the tobacco to have a very natural-like sweet rum taste and aroma on smoking.

(ii) At the rate of 500 ppm to each cigarette is added 2-butyl-2-butenal. The use of the 2-butyl-2-butenal at this level also causes the tobacco to have a distinct and natural rum flavor and aroma; much more natural than the same formulation without the 2-butyl-2-butenal, prior to smoking and on smoking.

What is claimed is:

1. A process for altering the flavor of foodstuff which comprises adding to said foodstuff, in an amount to impart thereto a nutty flavor, 2-butyl-2-butenal.

2. The process of claim 1 wherein there is additionally added to said foodstuff a flavor adjuvant selected from the group consisting of ethyl-2-methyl butyrate, vanillin, butyl valerate, 2,3-diethyl pyrazine, cyclotene, benzaldehyde, maltol, 1,2-benzodihydropyrone, anise aldehyde and ethyl vanillin.

* * * * *